US008788185B2

(12) United States Patent
Yen et al.

(10) Patent No.: US 8,788,185 B2
(45) Date of Patent: Jul. 22, 2014

(54) METHOD AND SYSTEM FOR ESTIMATING TRAFFIC INFORMATION BY USING INTEGRATION OF LOCATION UPDATE EVENTS AND CALL EVENTS

(75) Inventors: Sheng-Ying Yen, Changhua County (TW); Chih-Yen Huang, New Taipei (TW); Ya-Yun Cheng, Kaohsiung (TW); Chien-Hsiang Chen, Changhua (TW); Chung-Yung Chia, Taipei (TW)

(73) Assignees: Industrial Technology Research Institute, Hsinchu (TW); Chunghwa Telecom Co., Ltd., Taoyuan (TW)

( * ) Notice: Subject to any disclaimer, the term of this patent is extended or adjusted under 35 U.S.C. 154(b) by 136 days.

(21) Appl. No.: 13/559,610

(22) Filed: Jul. 27, 2012

(65) Prior Publication Data

US 2014/0011484 A1 Jan. 9, 2014

(30) Foreign Application Priority Data

Jul. 9, 2012 (TW) ............................ 101124681 A

(51) Int. Cl.
*H04W 4/02* (2009.01)

(52) U.S. Cl.
USPC ........ 701/117; 701/118; 701/119; 455/414.1; 455/456.1

(58) Field of Classification Search
USPC ........................ 701/117, 118, 119; 455/456.1
See application file for complete search history.

(56) References Cited

U.S. PATENT DOCUMENTS

| | | | | |
|---|---|---|---|---|
| 5,465,289 | A * | 11/1995 | Kennedy, Jr. | 455/424 |
| 5,559,864 | A * | 9/1996 | Kennedy, Jr. | 455/412.1 |
| 6,052,598 | A * | 4/2000 | Rudrapatna et al. | 455/456.1 |
| 6,782,264 | B2 * | 8/2004 | Anderson | 455/456.1 |
| 6,947,835 | B2 | 9/2005 | Kaplan et al. | |
| 7,142,977 | B2 | 11/2006 | Knuuttila et al. | |
| 7,546,128 | B2 * | 6/2009 | Smith et al. | 455/456.1 |
| 8,150,610 | B2 * | 4/2012 | Filizola et al. | 701/118 |
| 8,504,035 | B2 * | 8/2013 | Shin et al. | 455/435.1 |
| 8,559,976 | B2 * | 10/2013 | Miyake et al. | 455/456.1 |
| 2004/0243298 | A1 | 12/2004 | Knuuttila et al. | |
| 2006/0111126 | A1 * | 5/2006 | Chithambaram | 455/456.5 |
| 2009/0170533 | A1 * | 7/2009 | Filizola et al. | 455/456.5 |
| 2011/0117896 | A1 | 5/2011 | Soelberg et al. | |

OTHER PUBLICATIONS

Sankar et al., Intelligent Traffic Monitoring System Using Wireless Cellular Communications, IEEE 1997.*

(Continued)

*Primary Examiner* — Mary Cheung
*Assistant Examiner* — Michael Berns
(74) *Attorney, Agent, or Firm* — Lin & Associates IP, Inc.

(57) ABSTRACT

A method and system for estimating traffic information by using integration of location update events and call events uses a sample capturing and analyzing device to associate location area update (LAU) and call sample data of a plurality of mobile users. The sample data at least includes at least one LAU event of at least one mobile user of the plurality of mobile users, and call arrival (CA) or call completion (CC) events of at least one call. Based on the sample data, a computation device is used to determine the location information and time information of the at least one LAU event and the CA or CC event of the at least one call, and estimate traffic information of one or more designated roads according to the location information and time information.

17 Claims, 15 Drawing Sheets

(56) References Cited

OTHER PUBLICATIONS

Classification of Cellular Phone Mobility using Naive Bayes Model, Puntumapon, K; Pattara-atikom, W., Vehicular Technology Conference, 2008. VTC Spring 2008. IEEE, May 11, 2008, p. 3021-p. 3025.
Handover location accuracy for travel time estimation in GSM and UMTS, Gundlegard, D.; Karlsson, J.M., IET Intelligent Transport Systems, Jan. 1, 2009, p. 87-p. 94.
Road traffic estimation from location tracking data in the mobile cellular network, R. Bolla, F. Davoli, Wireless Communications and Networking Confernce, 2000. WCNC. 2000 IEEE, Jan. 1, 2000, p. 1107-p. 1112.
Generating Road Traffic Information from Cellular Networks—New Possibilities in UMTS, David Gundlegard; Johan M Karlsson, ITS Telecommunications Proceedings, 2006 6th International Conference, Jan. 1, 2006, p. 1128-p. 1133.

* cited by examiner

METHOD AND SYSTEM FOR ESTIMATING TRAFFIC INFORMATION BY USING INTEGRATION OF LOCATION UPDATE EVENTS AND CALL EVENTS

CROSS-REFERENCE TO RELATED APPLICATION

The present application is based on, and claims priority from, Taiwan Application No. 101124681, filed Jul. 9, 2012, the disclosure of which is hereby incorporated by reference herein in its entirety.

TECHNICAL FIELD

The present disclosure generally relates to a method and system for estimating traffic information by using integration of location update events and call events.

BACKGROUND

In the past, the acquisition of traffic information relies on informing initiative of local police and the public, or issuing feedback of a global positioning system (GPS)-based vehicle probe (GVP) and a fixed vehicle detector (VD) device. In recent years, the research and applications of traffic domain use different collection methods and technologies such as vehicle detector, GVP, electronic toll collection (ETC)-based vehicle probe (EVP), and cellular based vehicle probe (CVP) technologies to perform detection of vehicular traffic parameter data.

Mobile users have advantages of the mobile spatial dimension and time dimension. Existing CVP traffic information collection technologies use the mobile phone as the detect tool of traffic information, to collect the transfer signaling between the mobile phone and the network system. And most technologies estimate the vehicle speed on the road through the location of handover events and the location update events, and the time difference between the handover events and location update events, wherein these events may occur when the road users dial/answer the phones. FIG. 1 shows an exemplary schematic view that estimates the vehicle speed on the road by using two handovers caused by a mobile device dialing/answering the phone. In FIG. 1, the mobile device starts to dial/answer the phone at time $t_0$, a handover occurs on the location $L_1$ at the time $t_1$, and another handover occurs on the location $L_2$ at the time $t_2$, thus the vehicle speed on the road is estimated as $(L_2-L_1)/(t_2-t_1)$. FIG. 2 shows an exemplary schematic view that estimates the vehicle speed on the road by using two location updates of a mobile device. In FIG. 2, the mobile device starts to move from a location area LA0, an inter-location (inter-LA) update occurs on the location $L_1$ at the time $t_1$, and another inter-location update occurs on the location $L_2$ at the time $t_2$, the vehicle speed on the road is then estimated as $(L_2-L_1)/(t_2-t_1)$.

In existing technologies, for example, a technology performs the road test through vehicle equipped with a GPS and a mobile communications module, learns recording location information occurred by call handover, and determines the travel distance between the locations of two handovers; and then the vehicle speed on the road is estimated only by the geographical location of a base station for a mobile phone occurring the handover. Another technology, for example, collects the mobile communication signaling for the users occurring location update at two location areas (LAs); and the vehicle speed on the road is estimated only by the geographical location of a base station for a mobile phone occurring the location update.

Another technology captures the A/Abis interface signal from a global mobile communications system network, analyzes the mobile communication signaling of the location area update and associates with a data mining method to estimate the traffic information of the end-user. Yet another technology is a technology of traffic information of 3G-based mobile communication network signaling. This technique uses the normal location update (NLU) and utilizes the selected handover (SHO) to calculate the vehicle speed on the road.

The traffic information obtained from the above techniques may produce quantity instability of the traffic information. For example, the number of valid samples obtained through two handovers is too small, or the time interval between samples through two location area updates is too long. And these techniques may also cause high cost for vehicle detectors' deployment and operation.

Therefore, under the existing collection policies for the traffic information, how to use the technology with a largest coverage of traffic information collecting, to provide the more accurate traffic information data to the road users, and to reach a driving environment with the better quality is a very important issue.

SUMMARY

The exemplary embodiments of the present disclosure may provide a method and system for estimating traffic information by using integration of location update events and call events.

One exemplary embodiment relates to a method for estimating traffic information by using integration of location update events and call events, which is executed in a traffic information estimation system. The method comprises: associating location area update (LAU) and call sample data of at least one mobile user by using a sample capturing and analyzing device, wherein the sample data at least includes at least one LAU event of the at least one mobile user, and call arrival (CA) or call completion (CC) events of at least one call of the at least one mobile user; and based on the sample data, determining, by using a computation device, location information and time information of the at least one LAU event and the CA or CC events of the at least one call, and estimating, by using the computation device, traffic information of one or more designated roads according to the location information and time information.

Another exemplary embodiment relates to a system for estimating traffic information by using integration of location update events and call events. The system may comprise a sample capturing and analyzing device, and a computation device. The sample capturing and analyzing device is configured to associate location area update (LAU) and call sample data of at least one mobile user. The computation device, based on the sample data, determines location information and time information of at least one LAU event and at least one CA or CC event of at least one call, and estimates traffic information of one or more designated roads according to the location information and the time information.

The foregoing and other features and aspects of the disclosure will become better understood from a careful reading of a detailed description provided herein below with appropriate reference to the accompanying drawings.

DETAILED DESCRIPTION OF DISCLOSED EMBODIMENTS

Figure 1:
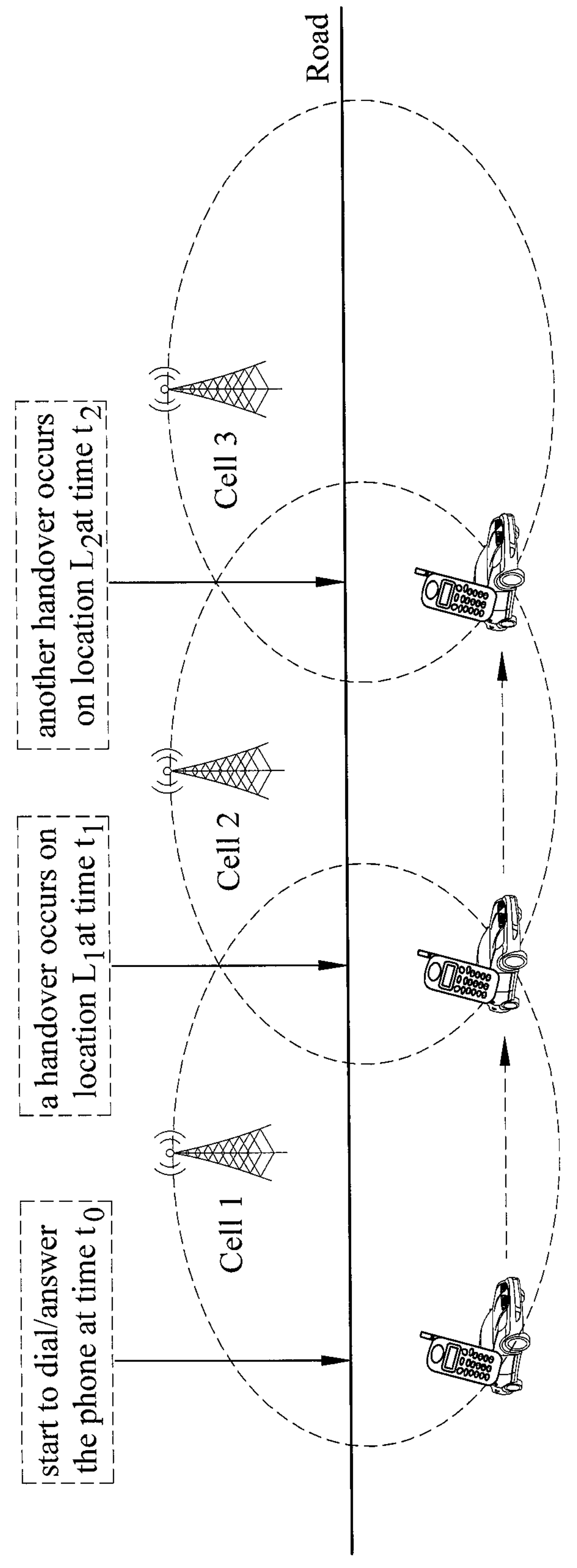
FIG.1 (PRIOR ART)
FIG. 1 illustrates an exemplary schematic view that estimates the vehicle speed on the road by using two handovers caused by a mobile device dialing/answering the phone.
Figure 2:
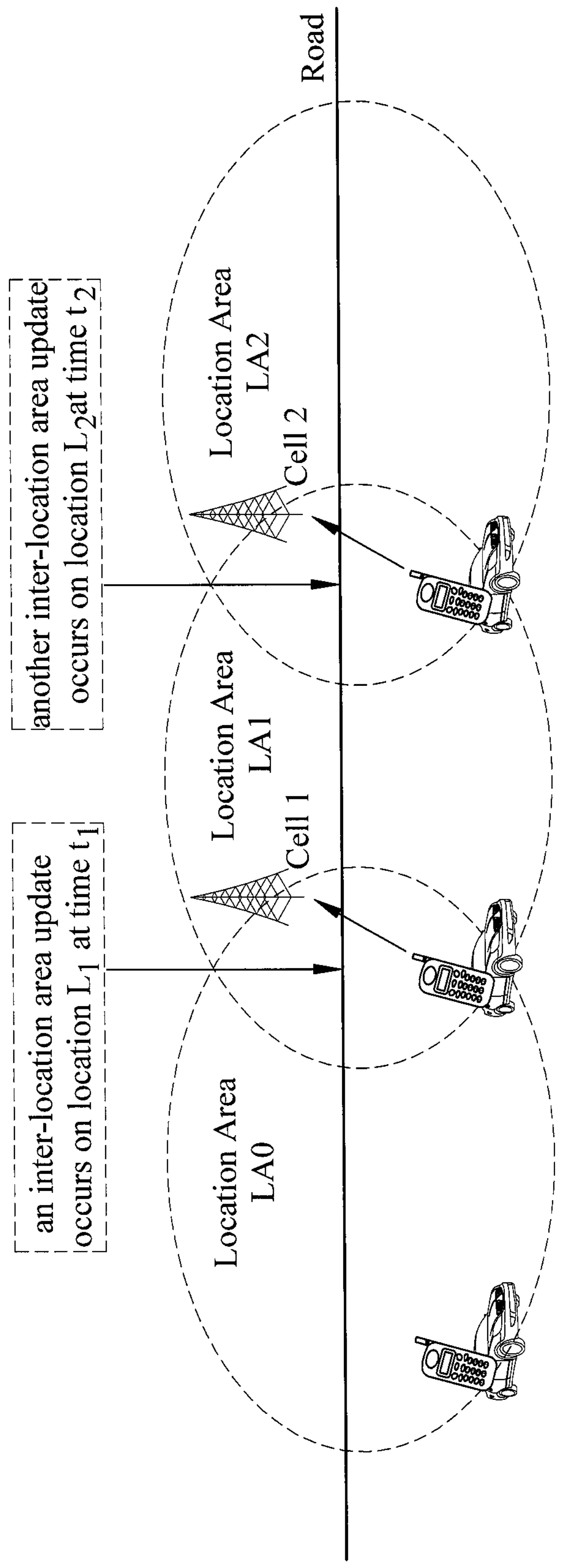
FIG.2 (PRIOR ART)
FIG. 2 shows an exemplary schematic view that estimates the vehicle speed on the road by using two location updates of a mobile device.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosed traffic information estimation technique, according to the exemplary embodiments, collects the transfer signaling such as call and location area update, between the mobile user and the mobile network through a sample capturing and analyzing device, to perform road correspondence and association for the located cells (latitude and longitude) having the occurring events such as location area update (LAU) events and call arrival (CA) event (such as mobile originated (MO) event, mobile terminated (MT) event), or call completion (CC) event of any prior or posterior call, in order to increase the number of valid samples, and automatically estimate traffic information of one or more road sections. In other words, this technique combines with recorded base station's geographical location and time of the call events and the LAU events to estimate the traffic information, such as the vehicle speed on the road of road section (at the border of the mobile network area, and any designated road location in the area) and information for the road congestion, and further utilizes the estimated vehicle speed on the road to estimate information such as the travel time of the road section.

The "call" in the disclosure could be, but not limited to, voice call, connection, etc.

The most two kinds of occurred events of network signaling are call event and LAU event. The call event may include three kinds of events. When a mobile user starts a call, a call arrived (CA) event is produced. The mobile network side will record occurrence time and base station relevant information for the CA event. When the mobile user crosses communication range of the base station during a call, a handover event is produced. The mobile network side will record occurrence time and the base station relevant information for the handover event. When the mobile user ends the call, a call completion (CC) event is produced. The mobile network will record occurrence time and the base station relevant information for the CC event.

When a mobile user moves from one location area LA1 to another location area LA2, the mobile device such as a mobile phone, will inform the mobile network side through a location area update procedure. The mobile network side may record the occurrence time of the location area update event and the sequence moving from LA1 to LA2 for the mobile user. The disclosed exemplary embodiments may use at least one LAU event and call arrival (CA) event or call completion (CC) event of mobile originated/mobile terminated to perform sample association, in order to increase the number of valid samples; and select the associated samples according to the records of the cells (performing road correspondence) and occurrence time of at least one occurred event, to increase road range and availability for promoting the traffic information applications.

Figure 3:
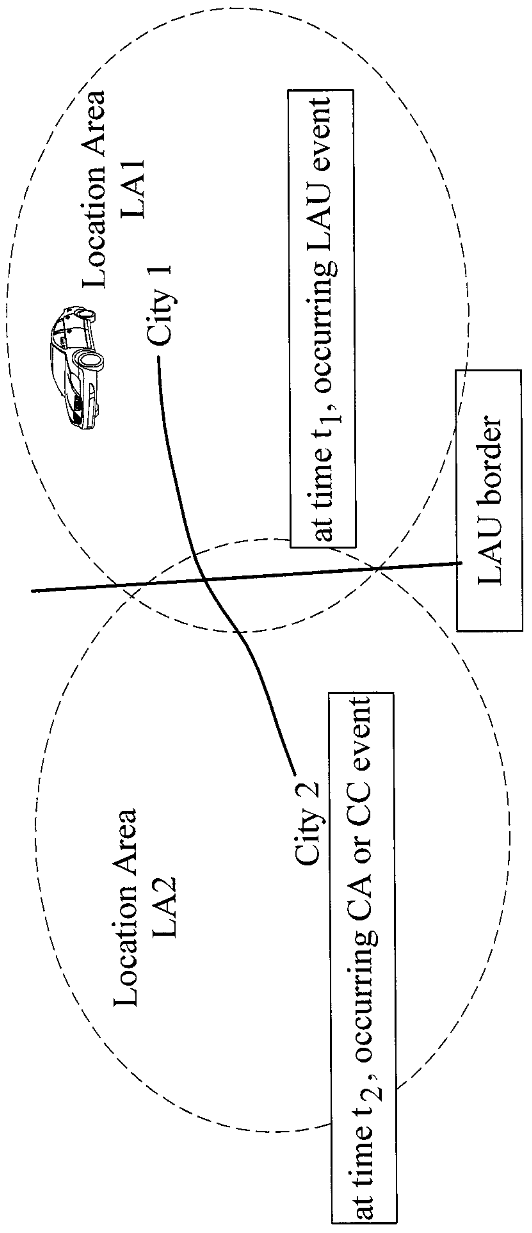
FIG. 3 shows a schematic view that performs sample association by using at least one LAU event and CA event or CC event, according to an exemplary embodiment.

FIG. 3 shows a schematic view that performs sample association by using at least one LAU event and CA event or CC event, according to an exemplary embodiment. As shown in FIG. 3, at time $t_1$, the mobile network side may record the mobile user occurring one LAU event, i.e., moving from the location area LA1 to the location area LA2; at time $t_2$, the mobile network side may also record the mobile user occurring one CA or CC event within the LA2 area. The disclosed exemplary embodiments also use the information of recorded valid samples to perform estimation of traffic information such as moving speed of the mobile device, the vehicle speed on the road, the information of road congestion, and travel time of the road section. The disclosed exemplary embodiments provide several schemes to estimate traffic information according to the occurred sequence of call events and LAU events of one or more mobile users.

Figure 4:
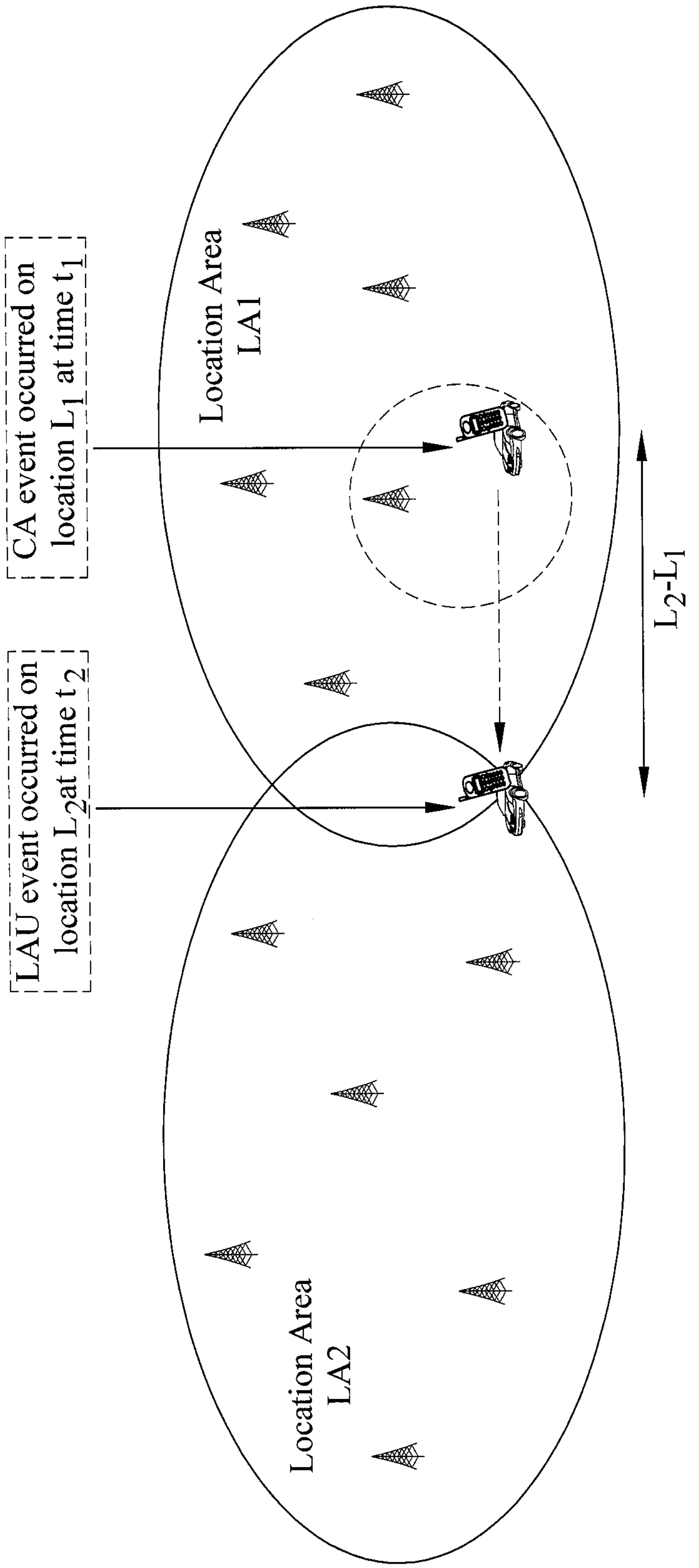
FIG. 4 shows a schematic view of a vehicle speed estimation scheme for a mobile device occurring one CA event first, and then occurring one LAU event, according to an exemplary embodiment.

FIG. 4 shows a schematic view of a vehicle speed estimation scheme for a mobile device occurring one CA event first, and then occurring one LAU event, according to an exemplary embodiment. As shown in FIG. 4, when the mobile user induces a CA event within the LA1 range, and ends the call within the LA1 range. And then the mobile user moves from location area LA1 to location area LA2, a LAU event occurred. A sample capturing and analyzing device is used to capture the occurrence time and the geographic location of the CA event and the LAU event, respectively. And based on the two occurrence times (for example, t1 and t2) and the two geographic locations (such as L1 and L2) for these two events, the sample capturing and analyzing device calculates a distance difference (such as L2-L1) and a time difference (such as t241) for these two events, and calculates the moving speed of the mobile user by using the distance difference divided by the time difference, and further estimates the vehicle speed of a vehicle that the mobile user is in. Also, the exemplary embodiment may select original samples through such as defined filter parameters, by using such as a road speed limit filtering scheme (such as deleting the samples exceeding a road speed limit) to obtain valid samples, and then adjusting the defined filter parameters to obtain, for example, top 50% of valid samples. Through such useful information, it may estimate traffic information such as an average vehicle speed of road sections (for example, between L1 and L2) and an average travel time (this may be obtained by dividing road section distance by each estimated vehicle speed and taking an average of the divided results).

Figure 5:
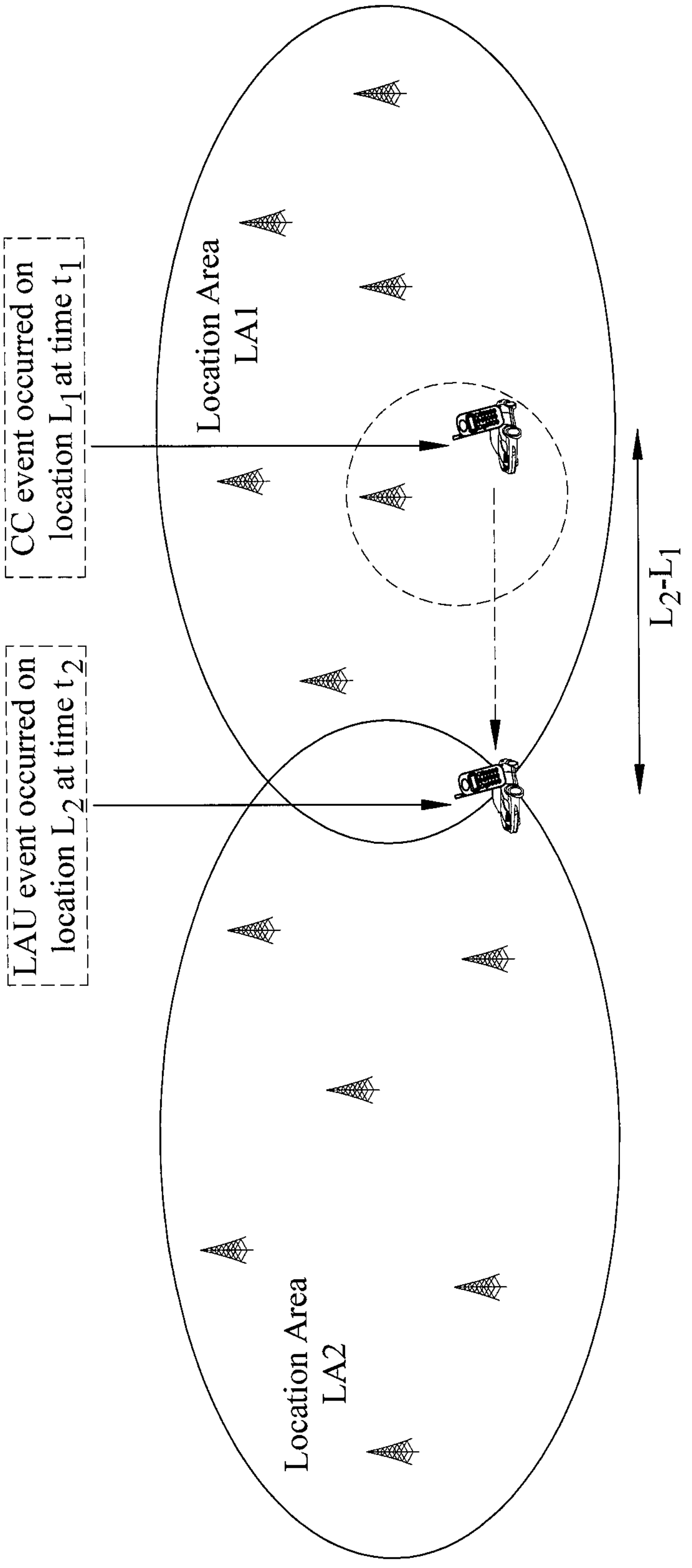
FIG. 5 shows a schematic view of a vehicle speed estimation scheme for a mobile device occurring one CC event first, and then occurring one LAU event, according to an exemplary embodiment.

FIG. 5 shows a schematic view of a vehicle speed estimation scheme for a mobile device having one CC event first, and then having one LAU event, according to an exemplary embodiment. As shown in FIG. 5, when the mobile user induces a CC event within the LA1 range, and then the mobile user moves from the LA1 range to the LA2 range, a LAU event occurred; similarly a sample capturing and analyzing device is used to capture the time and the geographical location of each CC event and each LAU event. And the sample capturing and analyzing device calculates the moving speed of the mobile user, and further estimates a vehicle speed of the vehicle that the mobile user is in. Also, the exemplary embodiment may select original samples through such as defined filter parameters, by using such as a road speed limit filtering scheme (such as deleting the samples exceeding a road speed limit) to obtain valid samples, and then adjusting the defined filter parameters to obtain, for example, top 50% of valid samples. Through such useful information, it may estimate traffic information such as an average vehicle speed of road sections (for example, between L1 and L2) and an average travel time (this may be obtained by dividing road section distance by each estimated vehicle speed and taking an average of the divided results).

Figure 6:
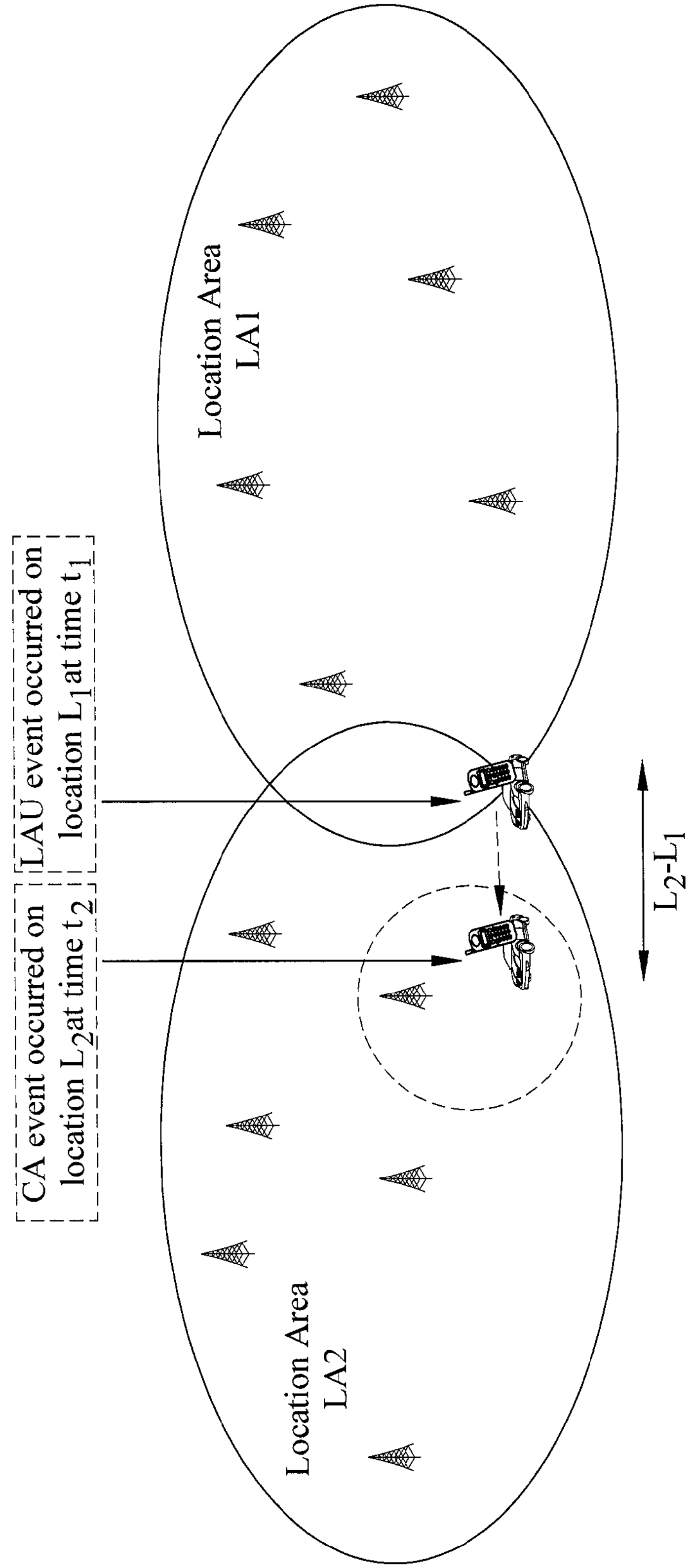
FIG. 6 shows a schematic view of a vehicle speed estimation scheme for a mobile device occurring one LAU event first, and then occurring a CA event, according to an exemplary embodiment.

FIG. 6 shows a schematic view of a vehicle speed estimation scheme for a mobile device having one LAU event first, and then having a CA event, according to an exemplary embodiment. As shown in FIG. 6, when the mobile user moves from the LA1 range to the LA2 range, a LAU event occurred, and then the mobile user induces a CA event within the LA1 range. Similarly, the time and the geographical location of each LAU event and each CA event may be captured. The moving speed of the mobile user may be computed. And a vehicle speed of the vehicle that the mobile user is in is further estimated. Also, the exemplary embodiment may select original samples through such as defined filter parameters, by using such as a road speed limit filtering scheme (such as deleting the samples exceeding a road speed limit) to obtain valid samples, and then adjusting the defined filter parameters to obtain, for example, top 50% of valid samples. Through such useful information, it may estimate traffic information such as an average vehicle speed of road sections (for example, between L1 and L2) and an average travel time (this may be obtained by dividing road section distance by each estimated vehicle speed and taking an average of the divided results).

Figure 7:
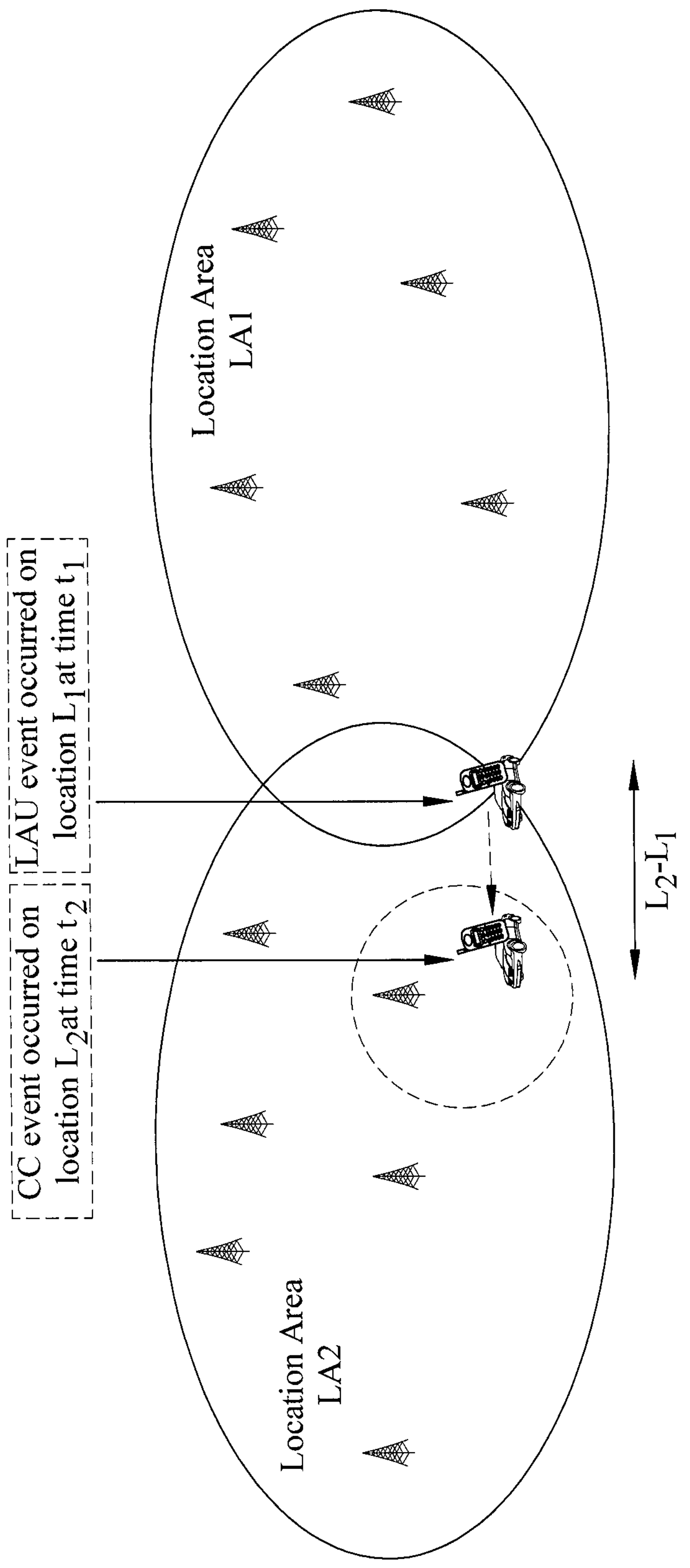
FIG. 7 shows a schematic view of a vehicle speed estimation scheme for a mobile device occurring one LAU event first, and then occurring one CC event, according to an exemplary embodiment.

FIG. 7 shows a schematic view of a vehicle speed estimation scheme for a mobile device having one LAU event first, and then having one CC event, according to an exemplary embodiment. As shown in FIG. 7, when the mobile user moves from the LA1 range to the LA2 range, a LAU event occurred, and then the mobile user induces a CC event within the LA1 range. Similarly, the time and the geographical location of each LAU event and each CA event may be captured. The moving speed of the mobile user may be computed. And a vehicle speed of the vehicle that the mobile user is in is further estimated. Also, the exemplary embodiment may select original samples through such as defined filter parameters, by using such as a road speed limit filtering scheme (such as deleting the samples exceeding a road speed limit) to obtain valid samples, and then adjusting the defined filter parameters to obtain, for example, top 50% of valid samples. Through such useful information, it may estimate traffic information such as an average vehicle speed of road sections (for example, between L1 and L2) and an average travel time (this may be obtained by dividing road section distance by each estimated vehicle speed and taking an average of the divided results).

Accordingly, the disclosed exemplary embodiments may determine the road congestion by associating LAU events and CA or CC events that are induced by the mobile device. For example, when the number of occurring the LAU events is greater than a first threshold value (or called the location update threshold), and the number of occurring the CA events and CC events before crossing the location area border or the number of occurring the CA events and CC events after crossing the location area border is greater than a second threshold value (or called the CA+CC threshold), the exemplary embodiments may issue a road congestion warning. The principle of determining road congestion according to the exemplary embodiments is that when road congestion occurs, the number of LAU events crossing the location area border is larger, and the number of CA or CC events for the road users is also larger. In other words, road congestion or not may be detected through the CA+CC threshold of the roads before or after crossing location area border and the location update threshold.

Figure 8:
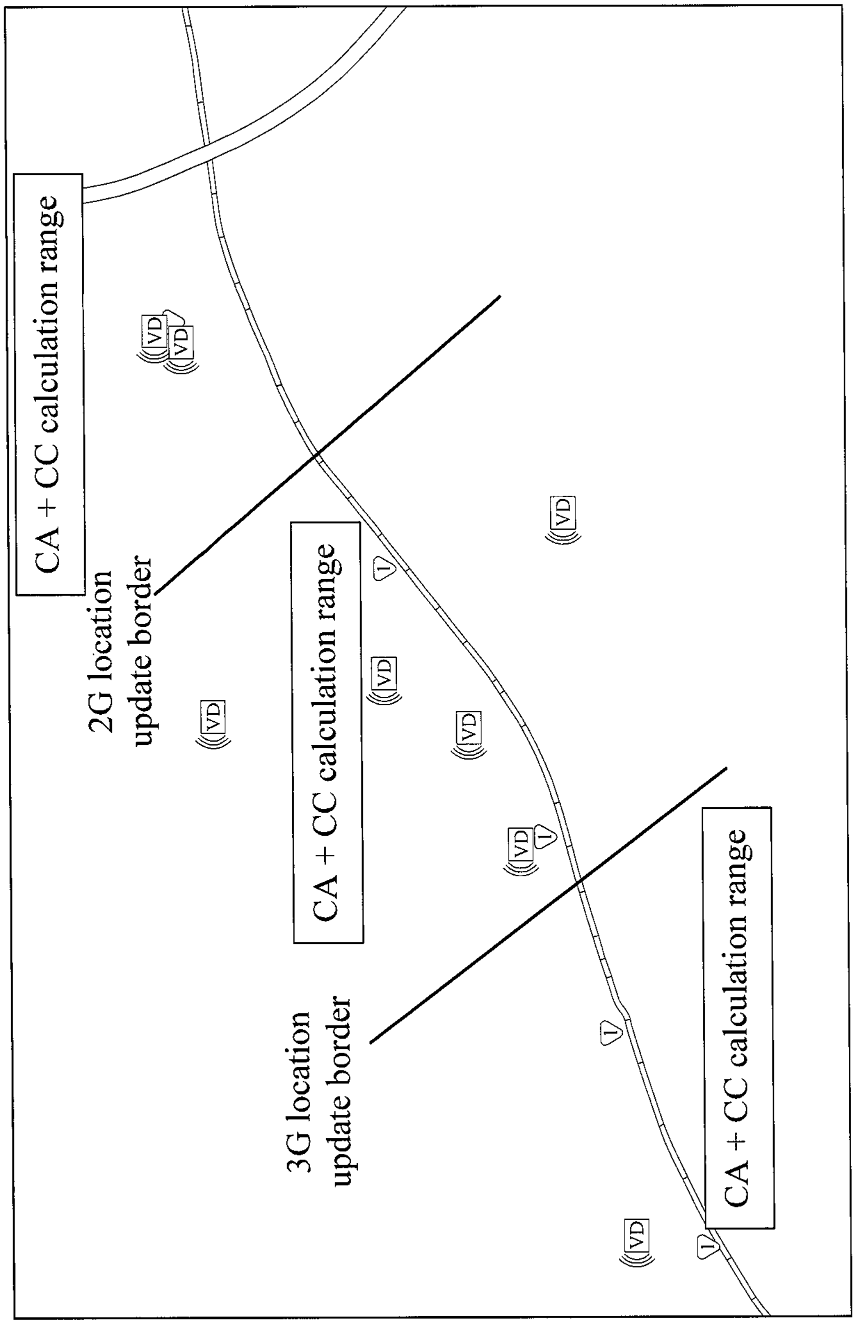
FIG. 8 shows an implementation of the determination of road congestion, according to an exemplary embodiment.

In the exemplary embodiment of FIG. 8, road sections are selected with the location area border being on a provincial highway of a city to another city, wherein the road sections contains the location update area border of the second-generation mobile communication technology (2G), and the location update area border of the third-generation mobile communication technology (3G). The exemplary embodiment of FIG. 8 shows an implementation of the determination of road congestion with actual statistics data. The source of this statistics data comes from capturing the number of LAU events every regular interval (e.g. 10 minutes), the number of CA and CC events before LAU event, and the number of CA and CC events after LAU event. The result shows that in the afternoon between 5:00 pm and 6:30 pm on one day, the number of LAU event in this section is over 200 (the first threshold, i.e., the LAU threshold), and the number of CA and CC events is over 10 (the second threshold, i.e., the CA+CC threshold). Therefore a road congestion warning is issued according to the disclosed exemplary embodiments.

Figure 9:
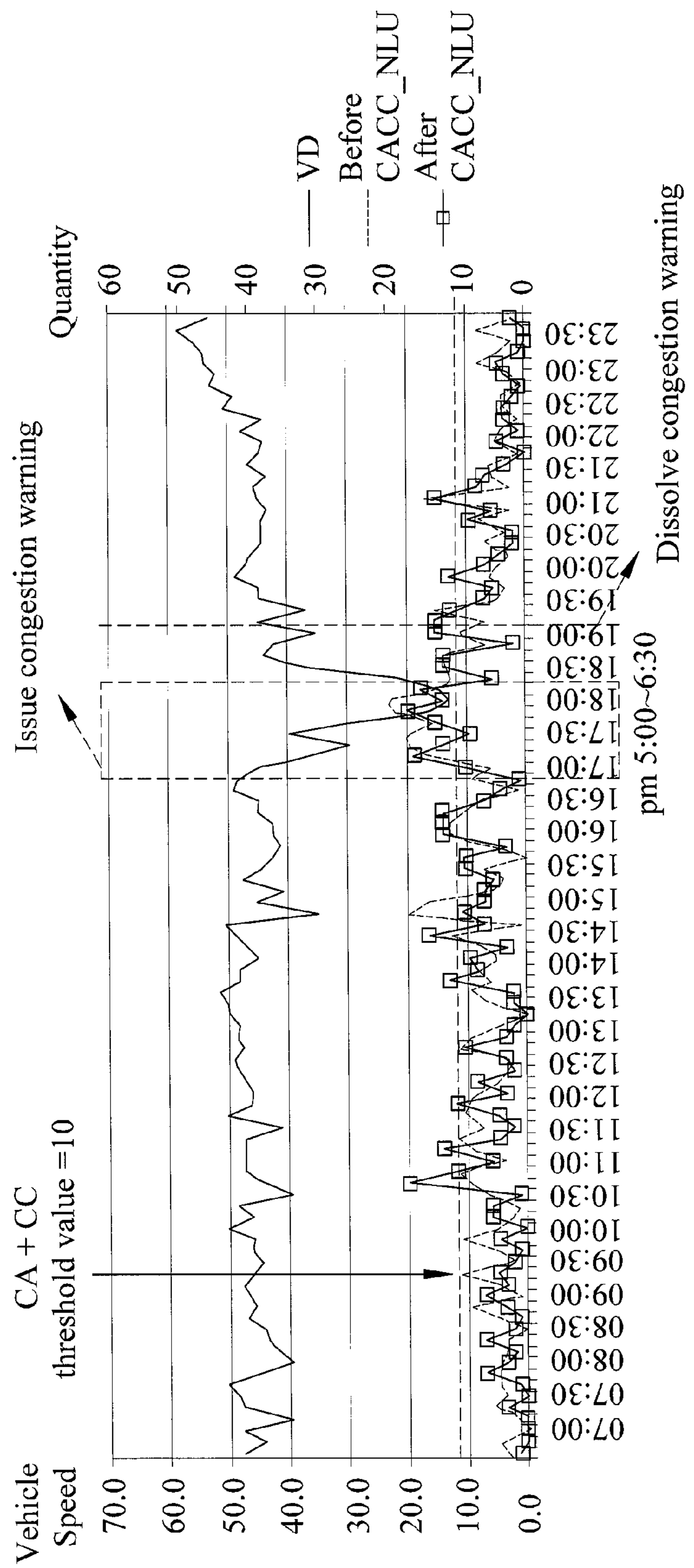
FIG. 9 shows a schematic view of a comparison between the statistic number of CA and CC events in FIG. 8 and the actual vehicle speed detected by the vehicle detector, according to an exemplary embodiment.

The aforementioned three values of statistics data may be compared with the actual vehicle speed detected by the vehicle detector. FIG. 9 shows a schematic view of a comparison between the statistic number of CA and CC events in FIG. 8 and the actual vehicle speed detected by the vehicle detector, according to an exemplary embodiment; and FIG. 10 shows a schematic view of a comparison between the statistic number of LAU events in FIG. 8 and the actual vehicle speed detected by the vehicle detector, according to an exemplary embodiment; wherein VD represents the vehicle speed detected by the vehicle detector, the before CACC_NLU represents the number of the CA+CC events before the LAU event, the after CACC_NLU represents the number of CA+CC events after the LAU event, the NLU represents the number of LAU events.

Figure 10:
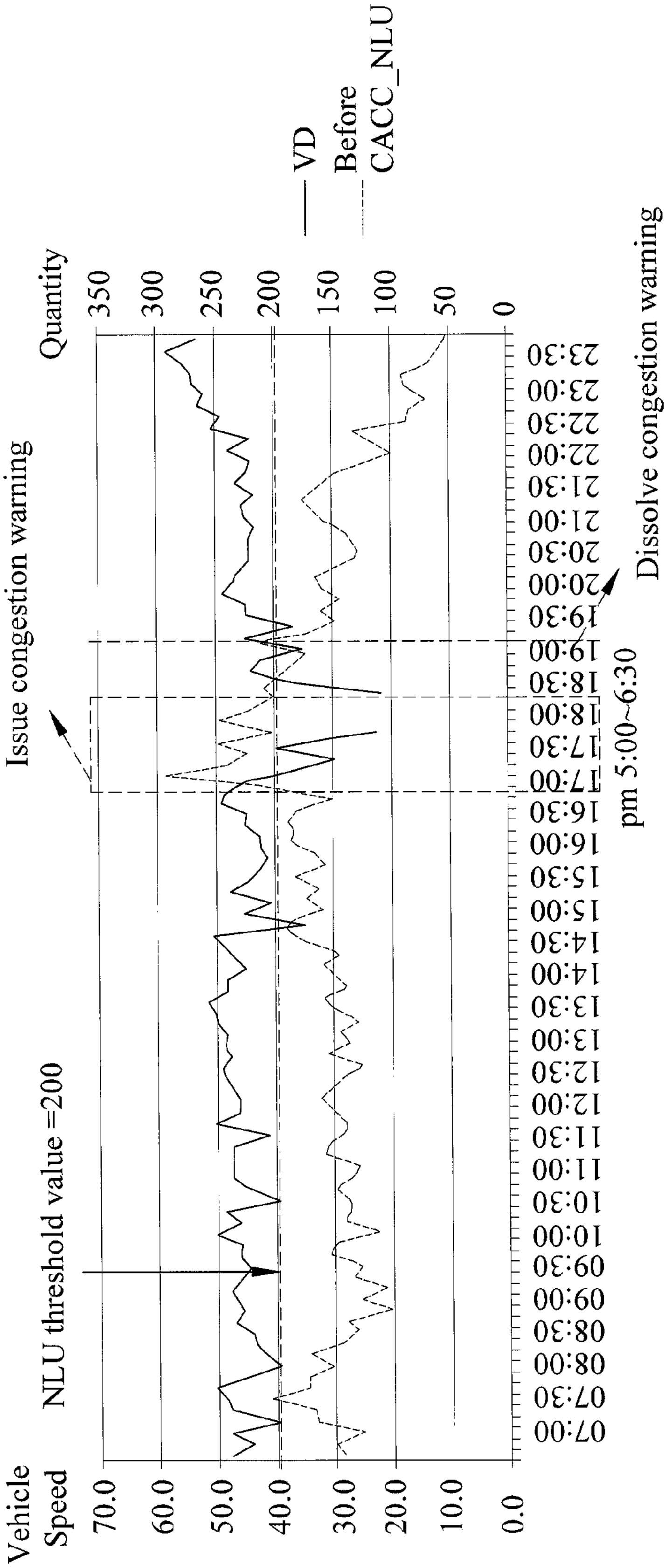
FIG. 10 shows a schematic view of a comparison between the statistic number of LAU events in FIG. 8 and the actual vehicle speed detected by the vehicle detector, according to an exemplary embodiment.

As shown in FIG. 9 and FIG. 10, the comparison result of vehicle speed with the vehicle speed detected by the vehicle detector matches the actual road condition. The vehicle speed detected by the vehicle detector starts to slow down from 5:00 pm till 6:30 pm, the vehicle speed starts to speed up. The number of LAU events decreases to less than 200 around 7:00 pm, and before the normal location is updated, the number of CA and CC events also decreases and is less than 10. Therefore, a road congestion warning might be relieved in accordance with the disclosed exemplary embodiments.

Figure 11:
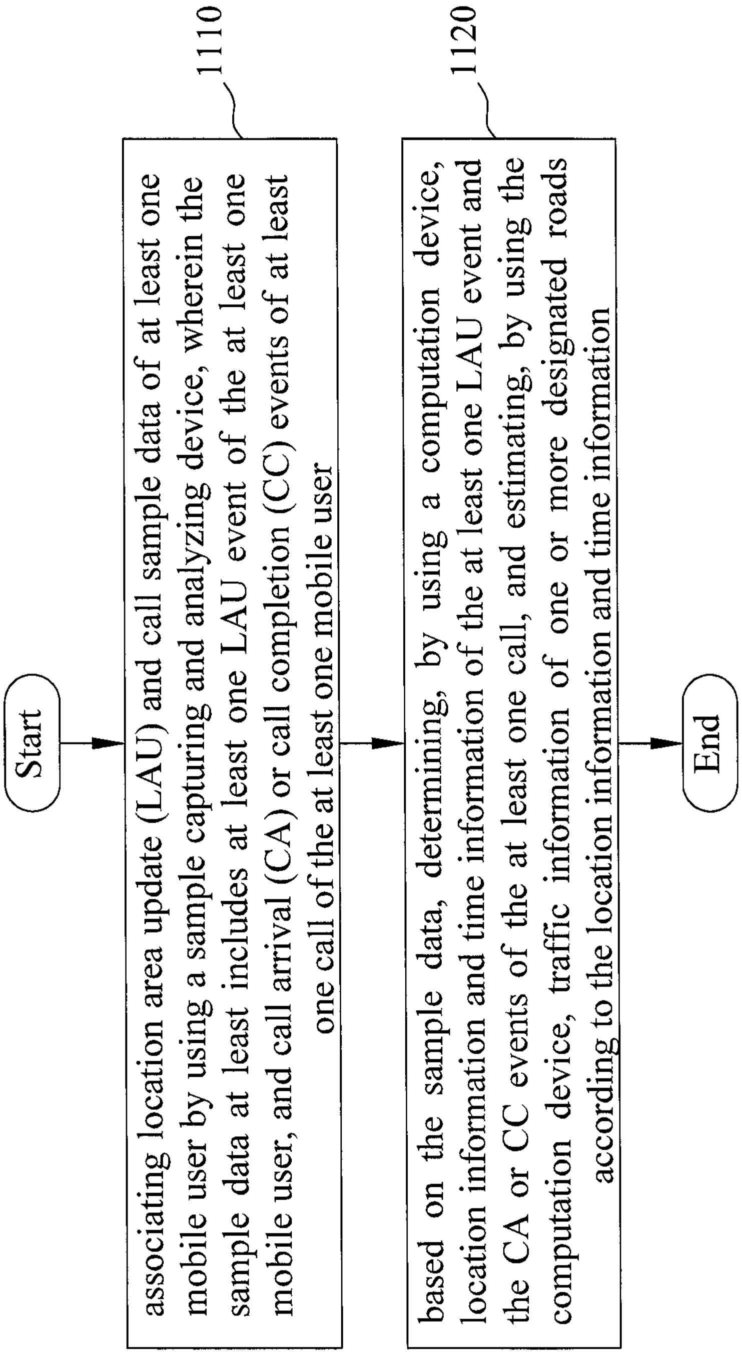
FIG. 11 shows a method for estimating traffic information by using integration of location update events and call events, according to an exemplary embodiment.

Accordingly, FIG. 11 shows a method for estimating traffic information by using integration of location update events and call events, according to an exemplary embodiment. In FIG. 11, the traffic information estimation method may associate location area update and call sample data of at least one mobile user by using a sample capturing and analyzing device, wherein the sample data at least includes at least one LAU event of the at least one mobile user, and call arrival (CA) or call completion (CC) events of at least one call of the at least one mobile user, as shown in step 1110. Based on the sample data, the traffic information estimation method may determine, by using a computation device, location information and time information of the at least one LAU event and the CA or CC events of the at least one call, and estimate, by using the computation device, traffic information of one or more designated roads according to the location information and time information, as shown in step 1120. The traffic information may be vehicle speed information of front and behind designated areas of the one or more designated roads, travel time information, road congestion information and so on, or any combination of these information. The computation device, for example, may be a device implemented by hardware circuits with estimation function, or by at least one hardware processor, or by at least one computer, etc., but is not limited to these hardware devices. The sample capturing and analyzing device may select data of the at least one mobile user from a mobile originated/mobile terminated (MO/MT) cell information database of a sample data system. The information may be such as LAU events, and prior or posterior mobile originated events of the at least one mobile user.

According to the disclosed exemplary embodiments, the sample capturing and analyzing device may select data of the mobile users to obtain LAU events and prior/posterior call events of the mobile users through a mobile originated/mobile terminated (MO/MT) cell information database. With a time interval of two prior/posterior events and a base station distance of these two events kept in the database, it may estimate one or more samples such as the vehicle speed on the road of front and behind designated areas of designated roads, travel time, etc. The traffic information estimation method may further use the mobile originated/mobile terminated cell information database to establish historical data of location update cell groups for at least one mobile network (for example, 2G or 3G mobile network) of the one or more designated roads, and establish historical data of the mobile originated/mobile terminated cell of the at least one mobile network for front and behind designated areas of the one or more designated roads.

According to the disclosed exemplary embodiments, the traffic information estimation method may further use a resident user filtering module, and the resident user filtering module may determine whether there is at least one resident user in the at least one mobile user, and then filter the sample data of the at least one resident user to obtain a valid sample collection, by using the historical data of the at least one mobile user, such as the base station data of the mobile user, geographical information system (Geographic Information System, GIS) information of to-be-tested roads, the traffic historical data of the mobile location update's information, MO/MT traffic historical data, etc. In the disclosure, a resident user may be defined as a user that has stayed at the range covered by a same group of mobile cells for more than a time unit, for example, a user that has stayed at the range covered by a same group of mobile cells for more than a location update period (such as an hour).

The samples that have been filtered the resident users may be filtered again via one or more selecting sample methods to obtain valid samples. The selecting sample methods may be such as the average standard deviation filtering method, the road speed limit filtering method, the percentage filtering method, the backtracking average standard deviation filtering method, road diverged event filtering method, historical difference filtering method, the law of large numbers filtering method, etc. The valid samples may be through road valid information estimation method and integrated with different mobile networks (e.g. 2G and 3G network) data to obtain traffic information such as the vehicle speed or the road section travel time, and so on. The road valid information estimation method may use such as methods of mean, mean of previous modes, weighted mean, maximum, median, mean of modes, geometric mean, harmonic average, historical weighted mean (the arithmetic average of current data and n weighted pervious historical data), and so on. Similarly, the samples that have been filtered resident users may also be used to detect road congestion via the above-mentioned NLU threshold (i.e. the threshold of the number of the LAU events) and the CA+CC thresholds of the roads before and after the border.

Figure 12:
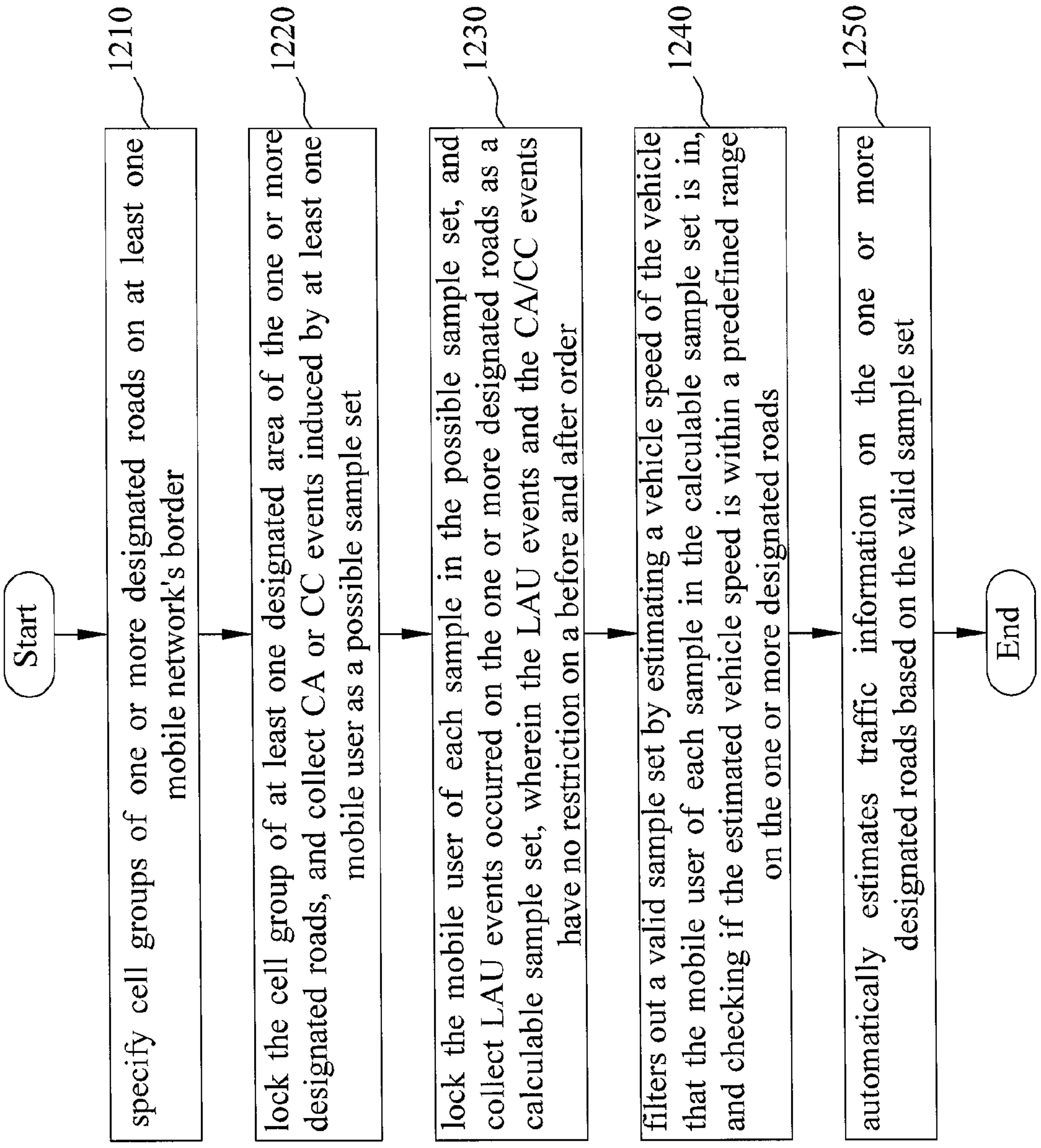
FIG. 12 shows a method illustrating how to use one LAU event and CA or CC event to perform sample association, according to an exemplary embodiment.

As mentioned earlier, the disclosed exemplary embodiments may perform sample association by using at least one LAU event and CA or CC event, and perform road correspondence via the cells having occurred the recorded events. FIG. 12 shows a method illustrating how to use one LAU event and CA or CC event to perform sample association, according to an exemplary embodiment. Referring to FIG. 12, first, the method specifies cell groups of one or more designated roads on at least one mobile network's border (step 1210); then, locks the cell group of at least one designated area of the one or more designated roads, and collects CA or CC events induced by at least one mobile user as a possible sample set (step 1220). The method then locks the mobile user of each sample in the possible sample set, and collects LAU events occurred on the one or more designated roads as a calculable sample set; wherein the LAU events and the CA/CC events have no restriction on a before and after order (step 1230).

The method further filters out a valid sample set by estimating a vehicle speed of the vehicle that the mobile user of each sample in the calculable sample set is in, and checking if the estimated vehicle speed is within a predefined range, such as within a maximum road speed and a minimum road speed, on the one or more designated roads (step 1240); and automatically estimates traffic information on the one or more designated roads based on the valid sample set (step 1250). The estimated traffic information may be, for example, the road speed estimation and the congestion estimation of the one or more designated roads, and the travel time of road sections of the one or more designated roads. In other words, the method filters out a valid sample set based on the vehicle speed of the vehicle that the mobile user of each sample in the calculable sample set is in, and further utilizes the valid sample set to estimate the traffic information on the one or more designated roads.

Figure 13:
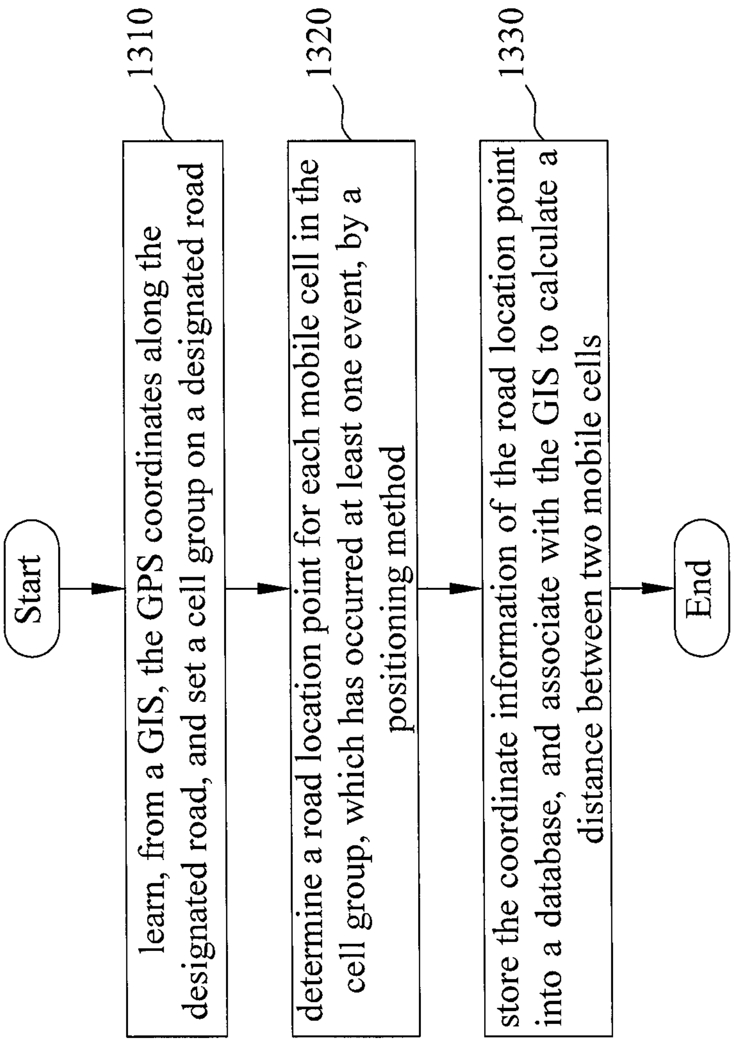
FIG. 13 shows a method illustrating a road correspondence for a cell of an occurred event, according to an exemplary embodiment.

The disclosed exemplary embodiments may increase the number of valid samples by the road correspondence and the sample association, and automatically estimate the traffic information of the road sections. The road correspondence indicates that an appropriate distance between a road and a mobile cell within a mobile cell coverage range is selected for an occurred event (LAU or mobile originated), and the appropriate distance may correspond to one location point on the road. FIG. 13 shows a method illustrating a road correspondence for a cell having occurred at least one event, according to an exemplary embodiment.

Referring to FIG. 13, the method may learn, from a GIS, the GPS (Global Positioning System) coordinates along a designated road, and set a cell group on the designated road (step 1310); and then determine a road location point for each mobile cell in the cell group, which has at least one occurring event, by a positioning method (step 1320). The method further stores the coordinate information of the road location point into a database, and associates with the GIS to calculate a distance between two mobile cells (step 1330). The positioning method may be, but not limited to, the directional positioning method, the vertical distance positioning method, the cell edge positioning method, the multi-cell center positioning method, the GPS road test positioning method, the signal strength positioning method, and so on. The directional positioning method uses the corresponding road location point of the mobile cell azimuth. The vertical distance positioning method uses the corresponding road location point having a shortest road distance from the base station. The cell edge positioning method uses the corresponding road location point at the edge of the mobile cell coverage. The multi-cell center positioning method uses the corresponding road location point having a shortest distance from an estimated center of at least one cell. The GPS road test positioning method obtains the available road location point of GPS coordinates through multiple road test results. The signal strength positioning method obtains the location point transformed by signal strength through multiple road test results, and uses the location point as the occurred event's location.

Figure 14:
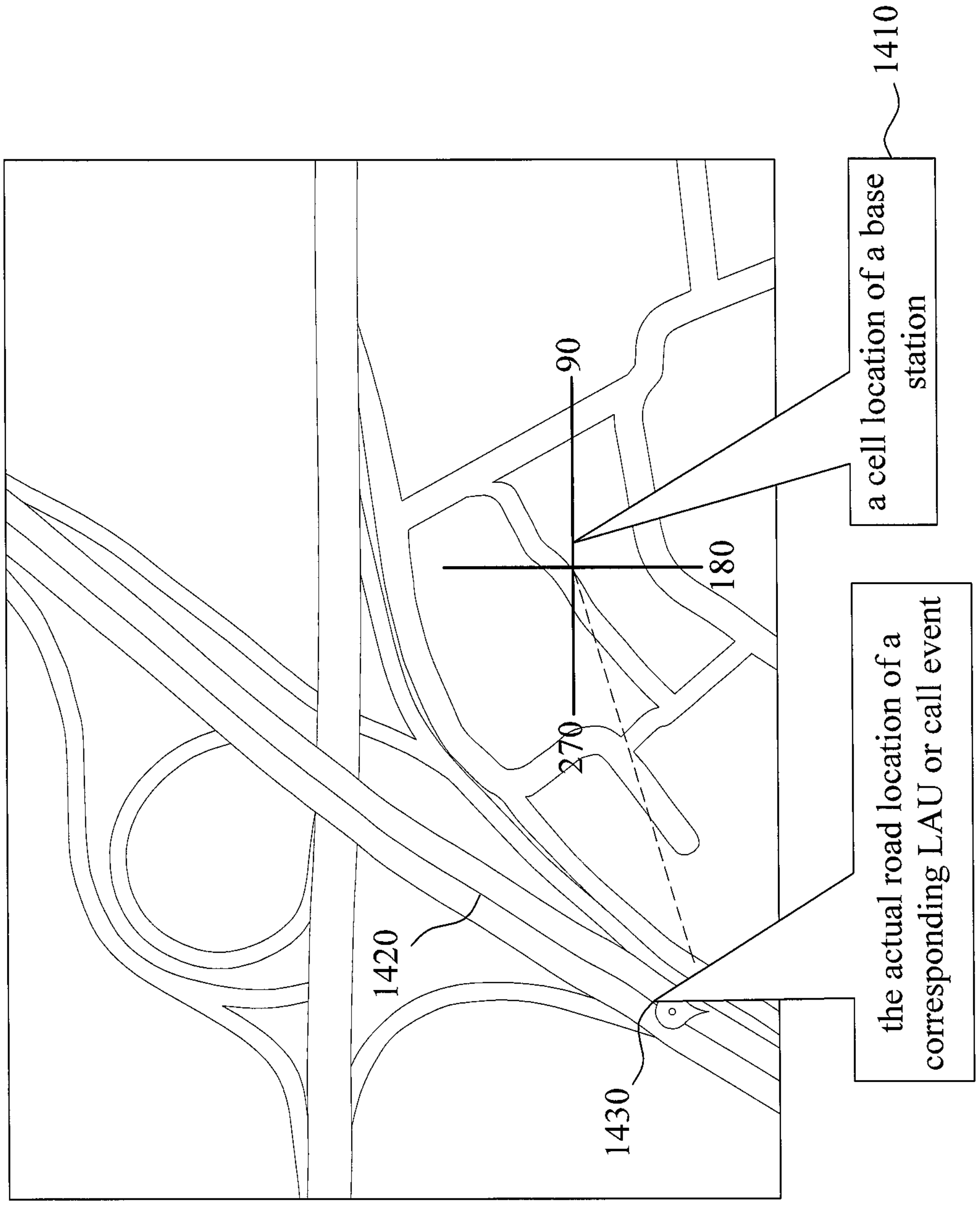
FIG. 14 shows an exemplar illustration a mobile cell of an occurred event and its corresponding road position point, according to an exemplary embodiment.

Take the direction positioning method as an example. The method finds the location and the antenna azimuth of each cell from a mobile base station database, and finds the GPS coordinates of the intersection of each cell along the azimuth and the straight line of the road as the corresponding road location point. FIG. 14 shows an exemplar illustration a mobile cell of an occurring event and its corresponding road position point, according to an exemplary embodiment. As shown in FIG. 14, label 1410 indicates a cell location of a base station. The GPS coordinate of an intersection 1430 of the cell along an antenna azimuth and a straight line 1420 of the designated road is the actual road location of a corresponding LAU or call event.

According to the data analysis and computation results of the aforementioned method, the disclosed exemplary embodiments of the traffic information estimation method may further provide to a media release interface (such as websites or navigation industry) to publish the traffic information of location update border's road section, such as vehicle speed information (such as vehicle speed of the designated road section), travel time information and road congestion information, and so on.

Figure 15:
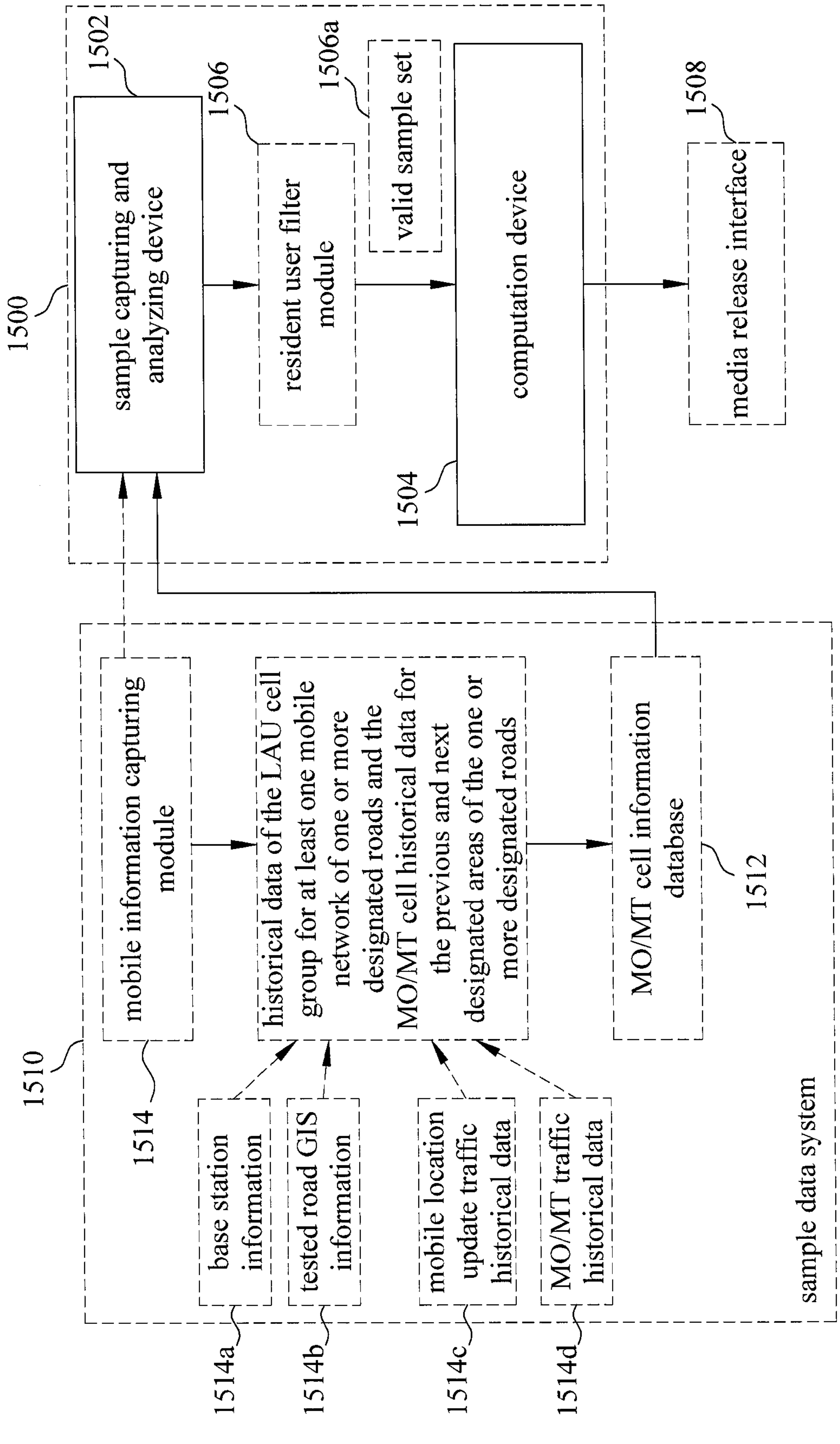
FIG. 15 shows a system for estimating traffic information by using integration of location update events and call events, according to an exemplary embodiment.

Accordingly, FIG. 15 shows a system for estimating traffic information by using integration of location update events and call events, according to an exemplary embodiment. As shown in FIG. 15, the traffic information estimation system 1500 comprises a sample capturing and analyzing device 1502 and a computation device 1504. The sample capturing and analyzing device 1502 captures LAU events and call events, and associates location area update (LAU) and call sample data of at least one mobile user based on the call sample data, the computation device 1504 determines the location information and time information of at least one LAU event, and at least one CA or CC event of at least one call, and estimates traffic information of one or more designated roads according to the location information and time information. The sample capturing and analyzing device 1502, for example, may use a mobile originated/mobile terminated cell information database 1512 in a sample data system 1510 to select information of the at least one mobile user, for obtaining LAU events and call events of the at least one mobile user. The computation device 1504 may be, but not limited to, a device implemented by hardware circuits with estimation function, or at least one hardware processor, or at least one computer, and so on.

The mobile originated/mobile terminated (MO/MT) cell information database 1512 may be established as follows. A mobile information capturing module 1514 in the sample data system 1510 first collects the mobile user information (for example, base station information 1514*a*, tested road GIS information 1514*b*, mobile location update traffic historical data 1514*c*, MO/MT traffic historical data 1514*d*, etc.), then automatically learns to establish the MO/MT cell information database for one or more designated roads of location area update, and to publishes the traffic information. Therefore, it may create and save the historical data of the location area update cell group for at least one mobile network (such as 2G or 3G mobile network, etc.) of one or more designated roads, and also create and save the MO/MT cell historical data for the front and behind designated areas of the one or more designated roads in the mobile originated/mobile terminated (MO/MT) cell information database 1512. These historical data may be for selecting and filtering usage of follow-up data. The historical data of the location area update cell group for at least one mobile network of one or more designated roads and the MO/MT cell historical data for the front and behind designated areas of the one or more designated roads may be established in the backend sample data system 1510 offline.

The traffic information estimation system 1500 may further include a resident user filtering module 1506 to determine whether there is at least one resident user, and then filter the sample data of the at least one resident user, so as to obtain a valid sample set1506*a*. The details have been described in the aforementioned.

The computation device 1504 may select valid samples by filtering again the valid sample set1506*a* that has been filtered by the resident user filtering module 1506, via one or more times' selecting sample methods (the usable selecting sample methods as previously described). The computation device 1504 may further integrate with different mobile intra-network (e.g. 2G and 3G network) data to estimate traffic information such as the vehicle speed on the road or the road section travel time, and so on. As mentioned above, the road congestion may also be detected via the above-mentioned NLU threshold (i.e. the threshold of the number of the LAU events), the CA+CC thresholds of the roads before and after the border, and comparing with the valid samples. The computation device 1504 may also provide, such as a media release interface 1508 to publish the estimated traffic information of location area update of border sections.

The computation device 1504 may also calculate vehicle speed and road section travel time by predefining and adjusting one or more filter parameters and one or more sampling parameters. The filter parameter such as the road speed limit, represents estimating the reasonable shortest and longest travel time as the filtering conditions. The sampling parameter such as sampling percentage of samples, represents sampling suitable samples according to a defined sampling percentage, to calculate the road section travel time. Example of the process to predefine and adjust filter parameters and sampling parameters is described below. The process uses the predefined filter parameters and sampling parameters to calculate the road section travel time; then adjusts filter parameters and sampling parameters, and calculate the road section travel time; then compares the travel time of before adjustment and after adjustment; accordingly, re-adjusts these parameters until the best parameter has been set. The adjustable range of road speed limit may be, for example, the fastest road speed limit is 40 to 80 kilometers per hour, and the slowest road speed limit is 5 to 30 kilometers per hour; and the adjustable range for sampling percentage is such as 10% to 50%.

Therefore, the disclosed exemplary embodiments provide a method and system for estimating traffic information by using integration of location update events and call events. The technology collects transferred signaling between the mobile phone and the mobile network system through a mobile network signaling capturing and analyzing device. The mobile network signaling may include call events and location area update (LAU) events. The exemplary embodiments perform road correspondence and association to at least one LAU event and at least one event for the cell (latitude and longitude) of any prior/posterior mobile originated (MO), mobile terminated (MT) or end of call, to calculate the traffic information of the road sections, such as the vehicle speed (between the mobile network area border and any designated road location in the area), the congestion estimation, the road section travel time, and so on.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for estimating traffic information by using integration of location update events and call events, executed in a traffic information estimation system, said method comprising:

using a sample capturing and analyzing device to capture location area update events and call events, and associate location area update (LAU) and call sample data of at least one mobile user, wherein the call sample data at least includes at least one LAU event of said at least one mobile user, and call arrival (CA) or call completion (CC) events of at least one call of the at least one mobile user; and based on the call sample data, determining, by using a computation device, location information and time information of the at least one LAU event and the CA or CC events of the at least one call, and estimating, by using the computation device, traffic information of one or more designated roads according to said location information and said time information, including the steps of:

specifying one or more cell groups of the one or more designated roads on at least one mobile network's border;

locking said one or more cell groups of at least one designated area of the one or more designated roads, and collecting the CA or CC events induced by said at least one mobile user as a possible sample set; and locking one or more mobile user of each sample in the possible sample set;

collecting LAU events occurred on the one or more designated roads as a calculable sample set;

filtering out a valid sample set based on a vehicle speed of a vehicle that a mobile user of each sample in said calculable sample set is in; and utilizing said valid sample set to estimate the traffic information on the one or more designated roads.

2. The method as claimed in claim 1, wherein the sample capturing and analyzing device uses a mobile originated/mobile terminated cell information database to select information of said at least one mobile user, to obtain said at least one LAU event and at least one prior or posterior call event of said at least one mobile user.

3. The method as claimed in claim 2, wherein the method uses the mobile originated/mobile terminated cell information database to establish historical data of at least one location update cell group for at least one mobile network of the one or more designated roads, and to establish historical data of a mobile originated/mobile terminated cell for front and behind designated areas of the one or more designated roads.

4. The method as claimed in claim 1, wherein the traffic information is one or more combinations of vehicle speed information on the road, travel time information, and road congestion information for front and behind designated areas of the one or more designated roads.

5. The method as claimed in claim 4, wherein said method further includes:

calculating vehicle speed and road section travel time and determining road congestion by predefining and adjusting at least one filter parameter and at least one sampling parameter.

6. The method as claimed in claim 1, wherein the method further uses a resident user filter module to determine whether there is at least one resident user of said at least one mobile user, and then filters the call sample data of said at least one resident user to obtain a valid sample set.

7. The method as claimed in claim 1, wherein the method uses said at least one LAU event and the CA or CC events of said at least one call to perform sample association, and to perform a road correspondence through at least one mobile cell of at least one recorded occurred event.

8. The method as claimed in claim 7, wherein the road correspondence is that an appropriate distance between one of the one or more designated roads and a mobile cell within a mobile cell coverage range of said at least one recorded occurring event is selected, and the appropriate distance corresponds to one location point on the one of the one or more designated roads.

9. The method as claimed in claim 8, wherein the road correspondence further includes:

learning, from a geographic information system, a plurality of coordinates along said one of the one or more designated roads, and setting a cell group on said one of the one or more designated roads; and for each mobile cell in said cell group, which has at least one occurring event, determining a road location point by a positioning method.

10. The method as claimed in claim 1, wherein said method uses said at least one LAU event, and said CA or CC events of said at least one call to determine road congestion, and when the number of occurring LAU events is greater than a first threshold, and the number of occurring CA and CC events before or after crossing a location area border is greater than a second threshold, then a road congestion warning is issued.

11. The method as claimed in claim 1, wherein said at least one LAU event occurs before or after the CA or CC events of said at least one call.

12. The method as claimed in claim 1, wherein the at least one call is a voice call or connection.

13. A system for estimating traffic information by using integration of location update events and call events, comprising:

a sample capturing and analyzing device that captures location area update events and call events, and associates location area update (LAU) and call sample data of at least one mobile user;

a resident user filtering module that determines whether there is at least one resident user, and filters the call sample data of the at least one resident user to obtain a valid sample set; and a computation device, based on the call sample data, configured to determine location information and time information of at least one LAU event and at least one call arrival (CA) or call completion (CC) event of at least one call, and estimate traffic information of one or more designated roads according to the location information and the time information;

wherein said sample capturing and analyzing device further selects information of said at least one mobile user via a mobile originated/mobile terminated (MO/MT) cell information database to obtain said at least one LAU event and a call event before or after said at least one LAU event of said at least one mobile user, and said computation device selects one or more valid samples by filtering the valid sample set that has been filtered by said resident user filtering module, via one or more selecting sample methods, and integrates with different mobile intra-network data to estimate traffic information.

14. The system as claimed in claim 13, wherein said mobile originated/mobile terminated (MO/MT) cell information database stores historical data of at least one LAU cell group for at least one mobile network of said one or more designated roads, and historical data of at least one MO/MT cell for front and behind designated areas of the one or more designated roads.

15. The system as claimed in claim 13, wherein said traffic information includes one or more combinations of vehicle speed information on the road, travel time information, and road congestion information of said one or more designated roads.

16. The system as claimed in claim 15, wherein said computation device calculates vehicle speed and road section travel time and determines road congestion, by predefining and adjusting at least one filter parameter and at least one sampling parameter.

17. The system as claimed in claim 13, wherein the at least one call is a voice call or connection.

* * * * *